United States Patent
Bohannon

(10) Patent No.: US 6,847,856 B1
(45) Date of Patent: Jan. 25, 2005

(54) METHOD FOR DETERMINING JUXTAPOSITION OF PHYSICAL COMPONENTS WITH USE OF RFID TAGS

(75) Inventor: Philip L. Bohannon, Bridgewater, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 10/651,740

(22) Filed: Aug. 29, 2003

(51) Int. Cl.[7] .................................... G08B 13/181
(52) U.S. Cl. ................ 700/115; 700/214; 340/539.13; 340/572.1
(58) Field of Search .................... 700/214, 215, 700/115; 340/539.13, 572.1

(56) References Cited

U.S. PATENT DOCUMENTS

| | | | | |
|---|---|---|---|---|
| 5,774,876 A | * | 6/1998 | Woolley et al. | 705/28 |
| 5,784,686 A | | 7/1998 | Wu | 455/45 |
| 5,886,634 A | * | 3/1999 | Muhme | 340/572.1 |
| 5,910,776 A | * | 6/1999 | Black | 340/10.1 |
| 5,952,922 A | | 9/1999 | Shober | 340/572.4 |
| 5,959,568 A | * | 9/1999 | Woolley | 342/42 |
| 6,084,530 A | * | 7/2000 | Pidwerbetsky et al. | 340/10.32 |
| 6,130,623 A | | 10/2000 | MacLellan | 340/825.54 |
| 6,184,841 B1 | | 2/2001 | Shober | 343/853 |
| 6,243,012 B1 | | 6/2001 | Shober | 340/572.7 |
| 6,753,790 B2 | * | 6/2004 | Davies et al. | 340/825.69 |

* cited by examiner

*Primary Examiner*—Leo Picard
*Assistant Examiner*—Michael D. Masinick
(74) *Attorney, Agent, or Firm*—Kenneth M. Brown

(57) ABSTRACT

Radio Frequency Identification (RFID) tags are used for automatically determining the connectivity or alignment between physical components, including, for example, connectivity of network cables and device ports, as well as alignment of components assembled by automated manufacturing systems. In one embodiment of the invention, accurate determinations of the physical three-dimensional locations of cables and equipment are employed to determine which cables are plugged into which device ports of which pieces of equipment. In another embodiment of the invention, multiple RFID tags are used to determine the appropriate alignment between components being assembled by an automated manufacturing system.

22 Claims, 3 Drawing Sheets

US 6,847,856 B1

METHOD FOR DETERMINING JUXTAPOSITION OF PHYSICAL COMPONENTS WITH USE OF RFID TAGS

FIELD OF THE INVENTION

The present invention relates generally to the field of Radio Frequency Identification (RFID) systems and more particularly to the use of RFID tags for determining the connectivity of or the proper alignment (e.g., abutment) between physical components.

BACKGROUND OF THE INVENTION

The management of complicated networks such as telecommunications networks or sophisticated computer networks is tremendously expensive. A substantial portion of this cost arises from incomplete, incorrect or ambiguous knowledge about a network. For example, a telecommunications network operator may not have an accurate record of how network switches are configured, leading to failed attempts to fix problems or provision new services. This lack of knowledge can in some instances be remedied by polling the networking equipment to determine its actual settings.

However, a more fundamental ambiguity arises at the physical level of network cable management. Network cables may be added, removed or moved by support personnel for a variety of reasons, often to solve urgent problems. However, it is very difficult to maintain an accurate record of exactly which cable is connected to what device port of what piece of equipment, since the cables may so easily be connected, disconnected, and reconnected.

Typically, network cable locations and connections are tracked manually, by, for example, putting printed tags on each cable, storing the tag-to-cable mappings in a database, and then attempting to manually keep the database up to date. In addition, physical inventories of network offices, in which the cables are identified, tagged and mapped, are themselves typically performed manually. In a large telecommunications or computer network system, it is an extremely expensive proposition to keep track of every cable, where it is, where it runs, and what device port on which piece of equipment it is plugged into. As a result, equipment inventory databases are notoriously inaccurate, and the negative results include, inter alia, loss of network capacity, increased service times and a much greater chance of disruptive service errors.

Another problem, seemingly unrelated to the network cable connectivity problem discussed above, involves automated manufacturing systems. Such systems typically involve the automated assembly of components, requiring the attachment of two components (at a time) in a predetermined way. Computer vision systems are often used in such environments to provide feedback from the manufacturing process to the controlling software, thereby allowing the components to be located precisely and correctly in three-dimensional space relative to one another. For example, in an automobile manufacturing facility, if a hood is to be attached to a car body, a computer vision system may be able to determine that the two edges are attached evenly and at the correct distance from one another. Unfortunately however, vision systems are extremely expensive and work only very locally within a limited field of view. In addition, the three-dimensional location information must be indirectly inferred from two-dimensional camera images.

Thus, to address both of the above-described problems, it would be highly advantageous if there were an automated mechanism for tracking the precise three-dimensional physical locations of components, from which one could thereby determine the appropriate connectivity or alignment between them. For example, it would be highly desirable to be able to track the physical location of network cables in general, and to be able to identify the connections between cables and equipment device ports in particular. In addition, it would be highly desirable to be able to automatically determine the correct alignment between two components in an automated manufacturing system in a direct manner in a relatively inexpensive way.

SUMMARY OF THE INVENTION

The present inventor has recognized that Radio Frequency Identification (RFID) tags can be advantageously used to provide a framework for automatically determining the connectivity of or the proper alignment (e.g., abutment) between physical components, including, for example, network cables and devices, as well as components assembled by automated manufacturing systems. As is well known to those skilled in the art, RFD technology allows an object bearing an RFID tag to be located in physical space—for example, it is well known that it can easily be determined that an object bearing an RFID tag is at least "near" an RFID sensing device. This is clearly quite useful in a number of common prior art applications of this technology, such as inventory management in retail and wholesale applications, automatic toll collection, tracking of vehicles, etc. Recently, however, the accuracy with which the location of an RFID tag (and thus the object bearing the RFID tag) can be located in three-dimensional space has improved significantly, which advantageously enables an additional and valuable class of new applications.

Specifically, with respect to the network inventory problem described above, for example, the use of RFID tags can be advantageously employed to automatically identify the presence and locations of network resources such as cables and equipment, and with the use of multiple, highly sensitive sensors, the use of such RFID technology can also allow for a real-time determination of the physical locations of these resources in three-dimensional space. In particular, and in accordance with one illustrative embodiment of the present invention however, such accurate determinations of the locations of cables and equipment can be advantageously employed to further determine which cables are connected to (ie., plugged into) which device ports of which pieces of equipment.

In addition, with respect to the automated manufacturing system problem described above, the use of multiple RFID tags with highly sensitive sensors can be advantageously employed in accordance with the principles of the present invention to determine the appropriate juxtaposition (e.g., proper alignment and/or abutment) between inventory components being assembled by the automated manufacturing system. Note that the word "juxtaposition" as used herein and in the claims hereof, is intended to encompass both "connectedness," such as in the case of a cable plugged into a port, as well as "abutment" and "alignment," such as in the case of two automated assembly system inventory components which are properly positioned and aligned or (Le., "lined up") for assembly. In other words, as used herein, two components are in "juxtaposition" when they are proximate (ie., near to or touching one other) and spatially coordinated with each other in a predetermined manner.

More specifically, in accordance with a first illustrative embodiment of the present invention, one or more reference RFID tags are attached to fixed locations on the faceplate of a network element, and other RFID tags are incorporated into the connectors at the end of each cable. Then, by precisely locating the tag at the end of a cable relative to the reference tag on the element, the exact port into which the cable is plugged (if any) may be advantageously determined. This capability may, for example, be advantageously used to automatically and rapidly conduct a physical inventory of a network.

And in accordance with a second illustrative embodiment of the present invention, one or more reference RFID tags are attached to fixed locations on a first inventory component to be assembled, and one or more other RFID tags are attached to a second inventory component to be attached to the first inventory component. Then, by precisely determining the location of each of these RFID tags relative to each other, it can be advantageously determined that the two inventory components have been appropriately connected to each other.

DETAILED DESCRIPTION

A First Illustrative Embodiment of the Present Invention

Figure 1:
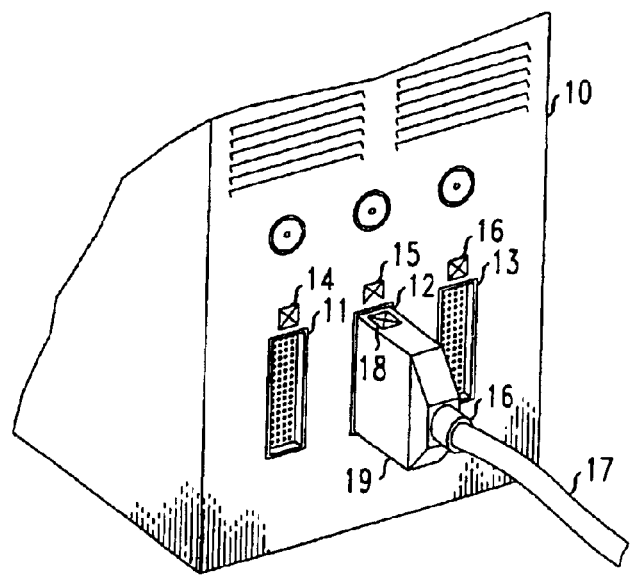
FIG. 1 shows an illustrative cable and a piece of equipment, each with RFID tags attached thereto in accordance with a first illustrative embodiment of the present invention.

FIG. 1 shows an illustrative cable and a piece of equipment, each with RFID tags attached thereto in accordance with a first illustrative embodiment of the present invention. The illustrated piece of equipment, device 10, has three device ports—device port 11, device port 12 and device port 13—each with a corresponding RFID tag— namely, tag 14, tag 15 and tag 16, respectively—attached to the faceplate of device 10 in very close proximity to the corresponding device ports. In addition, cable 17 has RFID tag 18 attached to cable connector 19 thereof. It will be obvious to those skilled in the RFID art that a number of high precision RFID sensors, which are not explicitly shown in the figure, will necessarily be located in the general vicinity of the components shown in the figure—such as, for example, on the walls of the room in which the components are located—in order to be able to accurately determine the locations of the various RFID tags.

Given the environment provided in FIG. 1, and in accordance with the principles of the present invention, the precise location in three-dimensional space of cable connector 19 can be determined, as can the precise location in three-dimensional space of each of the three device ports— device port 11, device port 12 and device port 13. Then, these determined locations can be advantageously compared to identify whether cable 17 is, in fact, connected to device port 11, device port 12, device port 13 or to none of these ports. As can be seen from the figure and as will be determined by the use of the method in accordance with the first illustrative embodiment of the present invention, cable connector 19 is, in fact, in close proximity to device port 12, and therefore it will be identified that cable 17 is connected to that particular port.

Figure 2:
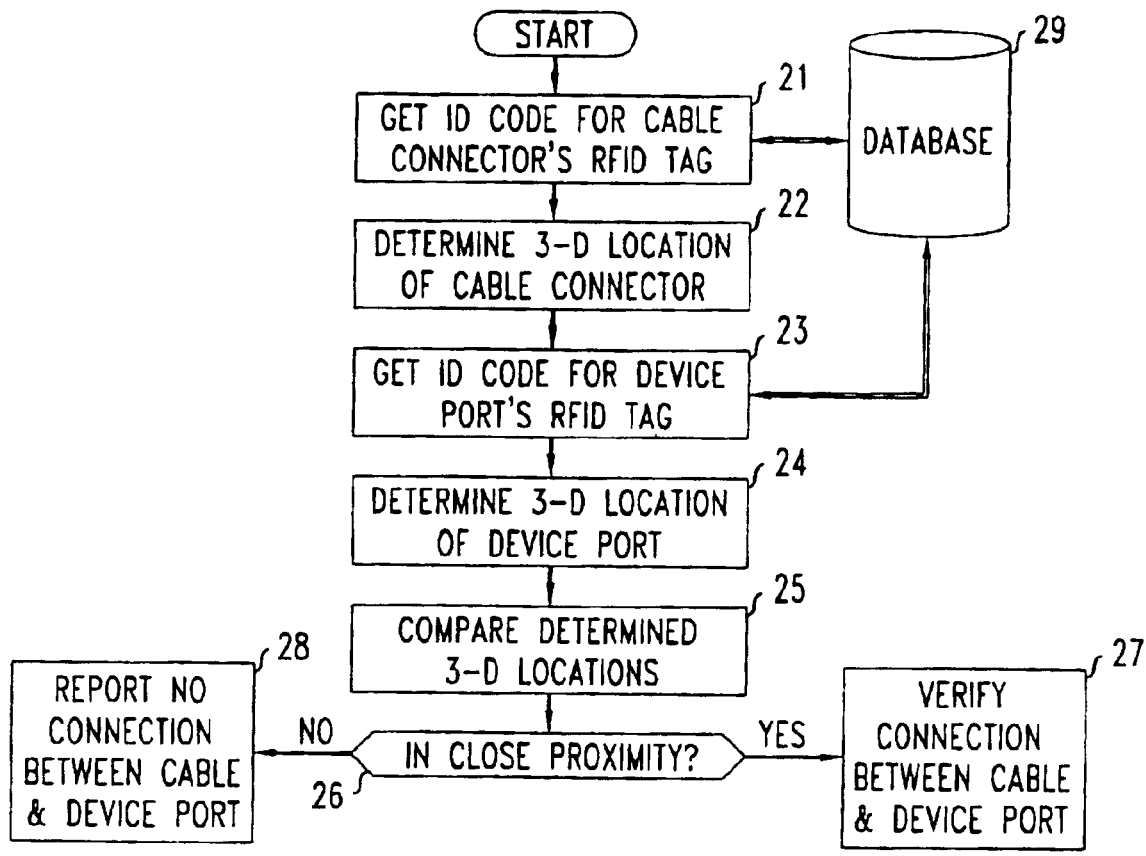
FIG. 2 shows a flowchart of the method of the present invention in accordance with the first illustrative embodiment thereof.

FIG. 2 shows a flowchart of the method of the present invention in accordance with the first illustrative embodiment thereof. Note that, in accordance with one illustrative embodiment of the present invention, the illustrative method shown in FIG. 2 may in particular be used to determine whether a given cable is connected to a given device port. Clearly, it will be obvious to one of ordinary skill in the art that this method can not only be used to verify an anticipated connection between a cable and a device port, but may, alternatively and in accordance with other illustrative embodiments of the present invention, be used iteratively to determine which of a plurality of cables is connected to a given device port, which of a plurality of device ports is connected to a given cable, or, more generally, which ones of a plurality of cables are connected to which ones of a plurality of device ports, to thereby perform a general network cable connection "inventory."

Specifically, the method shown in the flowchart of FIG. 2 determines whether a given cable is connected to a give device port. First, block 21 checks database 29 to determine the identity (e.g., identification code) of the RFID tag attached to the connector of the given cable. Then, using conventional RFID technology, block 22 determines the precise location in three-dimensional space of the cable connector (ie., of the identified RFID tag). Next, block 23 checks database 29 to determine the identity (e.g., identification code) of the RFID tag attached to the device faceplate next to the given device port. And then, again using conventional RFID technology, block 24 determines the precise location in three-dimensional space of the given device port. Finally, block 25 compares the two determined locations, and, if they are in sufficiently close proximity to each other (as determined by the comparison of decision block 26), the connection between the given cable and the given device port is verified in block 27. Otherwise, the connection does not exist, as reported in block 28. (Note that it will be clear to those skilled in the art that "sufficiently close proximity" to determine connectivity will depend on the particular application, such as, for example, the distance between neighboring device ports, and will be easily specifiable based thereupon.)

In certain alternative illustrative embodiments of the present invention, the relative locations of two RFD tags of interest (e.g., the RFID tag attached to the given cable and the RFID tag attached to the given device port) can be alternatively determined in other well-known ways. For example, in accordance with one illustrative embodiment of the present invention, rather than determining the location of each of these RFID tags and then comparing these locations, an "indirect" approach may be advantageously employed in which a signal is sent simultaneously to both RFID tags which immediately respond thereto, and a time difference is measured between the return signals from each of the tags. (This approach of measuring a time difference in a signal returned from multiple objects is conventional and will be fully familiar to those skilled in the art.)

And, in other illustrative embodiments of the present invention, individual RFID tags may not be specifically attached to (e.g. in close proximity to) individual device ports, but rather, one or more RFID tags may be located in fixed positions on the faceplate of the given piece of equipment (ie., the "device"). Then, in accordance with these other illustrative embodiments of the invention, the connectivity of a cable to a given device port may be advantageously determined based on the location of the RFID tag attached to the cable connector relative to the location of the one or more RFID tags attached to the faceplate. That is, rather than determining connectivity based merely on the physical proximity of one RFID tag (ie., the cable connector's tag) to another (i.e., the device port's tag), connectivity can instead be determined based on the relative locations of the cable connector's RFID tag to the one or more RFID tags attached to the faceplate of the device in combination with an a priori knowledge of the fixed location of the device port on the faceplate of the device relative to the fixed locations of the one or more RFID tags attached thereto.

With use of the above-described procedure, the connectivity of various cables to various device ports—on one or on a plurality of devices—can be easily determined and/or verified in accordance with one illustrative embodiment of the present invention. Note also that in accordance with another illustrative embodiment of the present invention, by repeatedly sampling these connections (or lack thereof), an automated system can advantageously raise an alarm whenever a cable is unplugged without authorization. Finally, by also incorporating multiple RFID tags at interval lengths along a cable, as well as at a variety of known locations in a building, the physical path of a cable can be traced all the way from its connection to one device port at one end of the cable to its connection to another device port at the other end of the cable, providing substantial value in planning for network upgrades or for construction around cable installations.

A Second Illustrative Embodiment of the Present Invention

Figure 3:
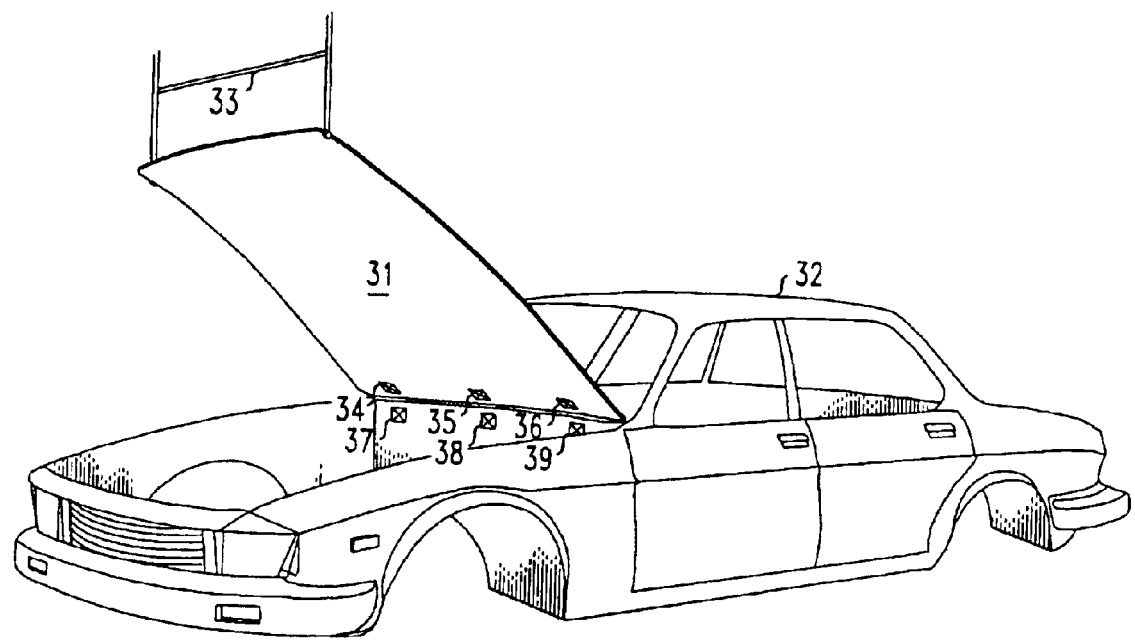
FIG. 3 shows an illustrative automated manufacturing system environment including a car body and a hood, each with RFID tags attached thereto in accordance with a second illustrative embodiment of the present invention.

FIG. 3 shows an illustrative automated manufacturing system environment including a car body and a hood, each with RFID tags attached thereto in accordance with a second illustrative embodiment of the present invention. In particular, the figure shows hood 31, being placed into position on car body 32 by mechanical "arm" 33. In accordance with the principles of the present invention, hood 31 illustratively includes three RFID tags—tag 34, tag 35 and tag 36—each attached thereto and positioned at well-defined and precise locations on the rear of the hood. Similarly, car body 32 illustratively includes three RFID tags—tag 37, tag 38 and tag 39—each attached thereto and positioned at well-defined and precise locations on the car body (where the hood is to be attached). Again, it will be obvious to those skilled in the RFID art that a number of high precision RFID sensors, which are not explicitly shown in the figure, will necessarily be located in the general vicinity of the components shown in the figure—such as, for example, on the walls of the room in which the components are located—in order to be able to accurately determine the locations of the various RFID tags.

Given the environment provided in FIG. 3, and in accordance with the principles of the present invention, the precise location and orientation of both hood 31 and car body 32 can be advantageously determined in three-dimensional space. Then, these locations and orientations can advantageously be compared to determine whether the components are properly attached (or in proper positioning to be attached). As can be seen in the figure, and as will be determined by the use of the method in accordance with the second illustrative embodiment of the present invention, hood 31 and car body 32 are properly positioned for attachment.

Figure 4:
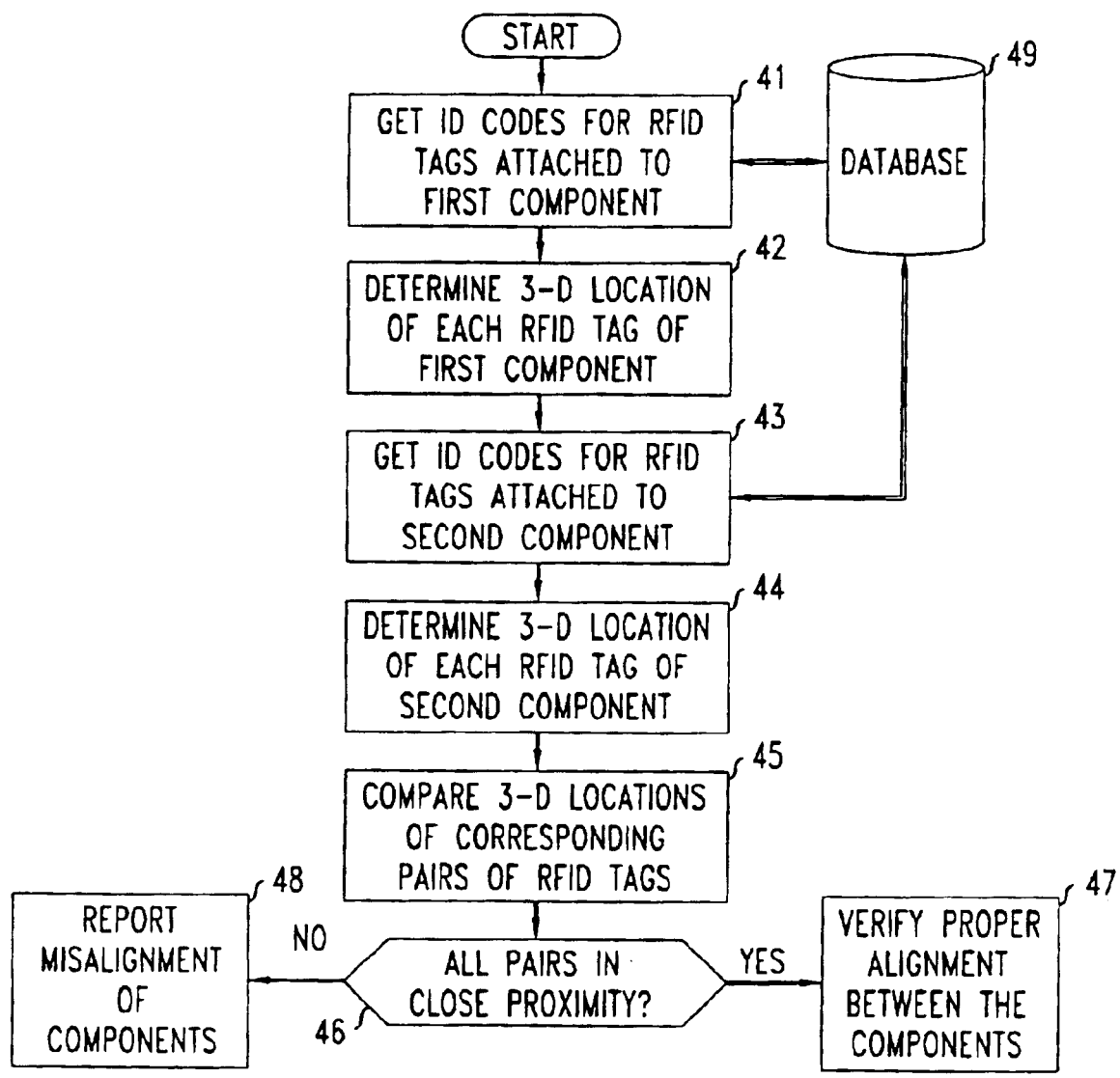
FIG. 4 shows a flowchart of the method of the present invention in accordance with the second illustrative embodiment thereof.

FIG. 4 shows a flowchart of the method of the present invention in accordance with the second illustrative embodiment thereof. Specifically, the method shown in the flowchart of FIG. 4 determines whether a first component is in appropriate alignment for connection to a second component. Illustratively, this procedure assumes that each component has a corresponding plurality of RFID tags arranged such that when the components are properly aligned, the corresponding RFID tags are in close proximity to each other. It will be obvious to those skilled in the art that numerous other approaches, all within the spirit and scope of the present invention, can be alternatively employed to verify that two components are in proper alignment for connection to each other (or, in other illustrative embodiments of the present invention, are in fact, properly connected) with use of one or more RFID tags attached thereto.

Specifically, in the method shown in FIG. 4, block 41 first checks database 49 to determine the number and identity (e.g., identification code) of the RFID tags attached to the first component. For example, with illustrative reference to FIG. 3, the first component may be the hood, and the database may indicate that there are three RFID tags which are attached thereto—a rear left corner tag, a rear center tag, and a rear right corner tag—each having a particular identity (e.g., identification code). Then, using conventional RFID technology, block 42 determines the precise location in three-dimensional space of each of these RFID tags, thereby defining the precise location and orientation of the hood. Next, block 43 checks database 49 to determine the number and identity (e.g., identification code) of the corresponding RFID tags attached to the second component. For example, again with illustrative reference to FIG. 3, the second component may be the car body, and the database may indicate that there are three RFID tags which are attached thereto—a left corner tag, a center tag, and a right corner tag—each having a particular identity (e.g., identification code). And then, again using conventional RFID technology, block 44 determines the precise location in three-dimensional space of each of these RFID tags, thereby defining the precise location and orientation of the car body. Finally, block 45 compares each of the corresponding pairs of determined RFID tag locations, and, if they are each in sufficiently close proximity to each other (as determined by the comparison of decision block 46), the proper alignment between the first component and the second component (e.g., hood and car body) can be confirmed in block 47. Otherwise, the alignment is not proper, as reported in block 48. (Note that it will be clear to those skilled in the art that "sufficiently close proximity" to confirm alignment will depend on the particular application, such as, for example, the particular type of components and the means which will be used to assemble them, and will be easily specifiable based thereupon.)

As pointed out above, it will be obvious to one skilled in the art that other procedures may be performed to verify correct alignment or connection of components. For example, referring again to the illustrative example of FIG. 3, additional RFID tags could advantageously be placed on the front end of the hood (as well as the rear) to ensure a proper orientation of the hood in the vertical dimension. In addition, similar procedures may be used to detect assembly line problems by, for example, noticing when a component is off of its desired location. And finally, if the precise three-dimensional locations of the RFID tags can be determined quickly enough, such procedures can advantageously be used directly to guide the actual movement of the manufacturing robot itself.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

I claim:

1. A computer implemented method for determining physical juxtaposition between a first component and a second component, the method comprising the steps of:

determining, using one or more RFID readers, one or more relative locations between one or more RFID tags in a first set of RFID tags and one or more RFID tags in a second set of RFID tags;

determining one or more physical distances between said one or more RFID tags in said first set of RFID tags and said one or more RFID tags in said second set of RFID tags based on said one or more determined relative locations, each RFID tag in the first set of RFID tags attached in a fixed positional relationship with the first component and each RFID tag in the second set of RFID tags attached in a fixed positional relationship with the second component; and determining juxtaposition between the first component and the second component based on said determined physical distances between said RFID tags in said first set of RFID tags and said RFID tags in said second set of RFID tags.

2. The method of claim 1 wherein the step of determining the physical distances between said RFID tags in the first set of RFID tags and said RFID tags in the second set of RFID tags comprises the steps of:

determining a physical location of each of said RFID tags in the first set of RFID tags;

determining a physical location of each of said RFID tags in the second set of RFID tags; and comparing the determined locations of said RFID tags in the first set of RFID tags with the determined locations of said RFID tags in the second set of RFID tags.

3. The method of claim 1 wherein the step of determining the physical distances between said RFID tags in the first set of RFID tags and said RFID tags in the second set of RFID tags comprises the steps of:

transmitting a signal to at least one of said RFID tags in said first set of RFID tags and to at least one of said RFID tags in said second set of RFID tags;

receiving returned signals from the at least one of said RFID tags in said first set of RFID tags and from the at least one of said RFID tags in said second set of RFID tags; and measuring one or more relative delays between said receipt of said returned signal from the at least one of said RFID tags in said first set of RFID tags and from said receipt of said returned signal from the at least one of said RFID tags in said second set of RFID tags.

4. The method of claim 1 wherein said first component comprises a cable connector attached to a cable, wherein said second component comprises a device port located on a faceplate of an associated equipment module, and wherein said step of determining juxtaposition between the cable connector and the device port comprises determining that said cable is connected to said device port.

5. The method of claim 1 wherein said first component and said second component comprise components to be assembled with use of an automated manufacturing system, and wherein said step of determining juxtaposition between the first component and the second component comprises determining that the first component and the second component are spatially coordinated in a predetermined manner to allow for assembly thereof.

6. A computer implemented method for determining connectivity between a given one of a set of one or more device ports and a given one of a set of one or more cables, each device port located on a faceplate of an associated equipment module, each cable having at least one connector associated therewith, the method comprising the steps of:

determining, using wireless technology, a relative location between a first RFID tag and a second RFID tag;

determining a physical distance between the first RFID tag and the second RFID tag based on said determined relative location, the first RFID tag attached to an associated connector of the given one of said cables and the second RFID tag associated with the given one of said device ports and attached to the faceplate of the equipment module associated with the given one of said device ports in a fixed positional relationship thereto; and determining whether said given one of said cables is connected to said given one of said device ports based on said determined physical distance between the first RFID tag and the second RFID tag.

7. The method of claim 6 wherein the step of determining the physical distance between the first RFID tag and the second RFID tag comprises the steps of:

determining a physical location of the first RFID tag;

determining a physical location of the second RFID tag; and comparing the determined location of the first RFID tag with the determined location of the second RFID tag to determine a distance therebetween.

8. The method of claim 7 wherein said determination that said given one of said cables is connected to said given one of said device ports is based on said determined distance between the determined location of the first RFID tag and the determined location of the second RFID tag being less than a predetermined threshold.

9. The method of claim 6 wherein the step of determining the physical distance between the first RFID tag and the second RFID tag comprises the steps of:
   transmitting a signal to the first RFD tag and to the second RFID tag,
   receiving returned signals from the first RFID tag and from the second RFID tag; and
   measuring a delay between said receipt of said returned signal from the first RFID tag and said receipt of said returned signal from the second RFID tag.

10. The method of claim 9 wherein said determination that said given one of said cables is connected to said given one of said device ports is based on said measured delay being less than a predetermined threshold.

11. The method of claim 6 further comprising the steps of:
   determining a physical distance between the second RFID tag and each of a plurality of cable RFID tags, each cable RFID tag attached to associated connectors of said one or more cables; and
   determining which of said one or more cables is connected to said given one of said device ports based on said determined physical distances between the second RFID tag and each of said plurality of cable RFID tags.

12. The method of claim 6 further comprising the steps of:
   determining a physical distance between the first RFID tag and one or more port RFID tags, each port RFID tag associated with at least one of said device ports and attached to a faceplate of an equipment module associated with said at least one of said device ports; and
   determining which of said one or more device ports is connected to said given one of said cables based on said determined distances between the first RFID tag and each of said plurality of port RFID tags.

13. The method of claim 6 further comprising the steps of:
   determining a physical distance between each of a plurality of cable RFID tags and each of one or more port RFID tags, each cable RFID tag attached to associated connectors of said one or more cables and each port RFID tag associated with at least one of said device ports and attached to a faceplate of an equipment module associated with said at least one of said device ports; and
   determining which of said one or more cables is connected to which of said one or more device ports based on said determined distances between the cable RFID tags and the port RFID tags.

14. The method of claim 6 further comprising the step of triggering an alarm when it has been determined that a given cable is not connected to a given device port.

15. The method of claim 6 wherein each of said one or more cables has two connectors associated therewith, the method further comprising the step of determining which of said one or more device ports is connected to each of said connectors of each of said cables.

16. The method of claim 15 wherein each of said one or more cables has a plurality of additional RFID tags attached thereto at a corresponding plurality of locations along its length.

17. A computer implemented method for performing automated manufacturing by determining an inter-positional relationship between a first component and a second component, the method comprising the steps of:
   determining, using wireless technology, one or more relative locations between one or more of a first set of RFID tags and one or more of a second set of RFID tags;
   determining one or more physical distances between said one or more of a first set of RFID tags and said one or more of a second set of RFID tags based on said one or more determined relative locations, each RFID tag in said first set of RFID tags attached to the first component at a predetermined position thereupon and each RFID tag in said second set of RFID tags attached to the second component at a predetermined position thereupon;
   determining a physical location of the first component relative to a physical location of the second component based on the determined physical distances between the RFID tags in the first set of RFID tags and the RFID tags in the second set of RFID tags; and
   determining, based on the physical location of the first component relative to the physical location of the second component, whether the first component and the second component are spatially coordinated in a predetermined manner to allow for assembly thereof.

18. The method of claim 17 wherein the step of determining one or more physical distances between RFID tags in the first set of RFID tags and RFID tags in the second set of RFID tags comprises the steps of:
   determining a physical location of at least one RFID tag in the first set of RFID tags;
   determining a physical location of at least one RFID tag in the second set of RFID tags;
   comparing the determined physical location of said at least one RFID tag in the first set of RFID tags with the determined physical location of said at least one RFID tag in the second set of RFID tags.

19. The method of claim 17 wherein the step of determining one or more physical distances between RFID tags in the first set of RFID tags and RFID tags in the second set of RFID tags comprises the steps of:
   transmitting a signal to at least one of said RFID tags in said first set of RFID tags and to at least one of said RFID tags in said second set of RFID tags;
   receiving returned signals from the at least one of said RFID tags in said first set of RFID tags and from the at least one of said RFID tags in said second set of RFID tags; and
   measuring one or more relative delays between said receipt of said returned signal from the at least one of said RFID tags in said first set of RFID tags and from said receipt of said returned signal from the at least one of said RFID tags in said second set of RFID tags.

20. The method of claim 17 wherein the step of determining the physical location of said first component relative to the physical location of said second component further comprises determining a physical orientation of at least one of said first component and said second component, and wherein the step of determining whether the first component and the second component are spatially coordinated in said predetermined manner to allow for assembly thereof further comprises determining whether said physical orientation of said at least one of said first component and said second component allows for said assembly thereof.

21. The method of claim 17 further comprising the step of triggering an alarm when it has been determined that the physical location of said first component relative to the physical location of said second component is not spatially coordinated in said predetermined manner to allow for assembly thereof.

22. The method of claim 17 further comprising the step of guiding a manufacturing robot used in said automated manufacturing process based on said determination whether the first component and the second component are spatially coordinated in said predetermined manner to allow for assembly thereof.

* * * * *